United States Patent [19]
Klosterman

[11] Patent Number: 5,923,362
[45] Date of Patent: *Jul. 13, 1999

[54] MERGING MULTI-SOURCE INFORMATION IN A TELEVISION SYSTEM

[75] Inventor: Brian Lee Klosterman, San Ramon, Calif.

[73] Assignee: StarSight Telecast, Inc., Fremont, Calif.

[ * ] Notice: This patent is subject to a terminal disclaimer.

[21] Appl. No.: 08/826,030

[22] Filed: Mar. 28, 1997

Related U.S. Application Data

[63] Continuation of application No. 08/623,429, Mar. 28, 1996, which is a continuation of application No. 08/424,861, Apr. 17, 1995, Pat. No. 5,550,576.

[51] Int. Cl.$^6$ ....................................................... H04N 7/10
[52] U.S. Cl. ............................ 348/12; 348/906; 348/13; 348/584; 348/569
[58] Field of Search ............................ 348/6, 7, 12, 13, 348/906, 569, 460, 468, 584, 600; 455/3.2, 4.1, 4.2, 5.1, 6.1

[56] References Cited

U.S. PATENT DOCUMENTS

| | | |
|---|---|---|
| 3,730,986 | 5/1973 | Morchand . |
| 3,745,240 | 7/1973 | Morchand et al. . |
| 4,488,179 | 12/1984 | Kruger et al. . |
| 4,706,121 | 11/1987 | Young . |
| 4,751,578 | 6/1988 | Reiter et al. . |
| 4,908,713 | 3/1990 | Levine . |
| 4,977,455 | 12/1990 | Young . |
| 5,123,046 | 6/1992 | Levine . |
| 5,151,789 | 9/1992 | Young . |
| 5,179,439 | 1/1993 | Hashimoto . |
| 5,231,494 | 7/1993 | Wachob . |
| 5,307,173 | 4/1994 | Yuen et al. . |
| 5,353,121 | 10/1994 | Young et al. . |
| 5,410,344 | 4/1995 | Graves et al. . |
| 5,436,626 | 7/1995 | Pint et al. . |
| 5,576,755 | 11/1996 | Davis et al. . |
| 5,619,274 | 4/1997 | Roop et al. ............................... 348/461 |
| 5,625,406 | 4/1997 | Newberry et al. ....................... 348/906 |
| 5,635,978 | 6/1997 | Alten et al. .............................. 348/906 |
| 5,635,989 | 6/1997 | Rothmuller .............................. 348/906 |
| 5,642,153 | 6/1997 | Chaney et al. ........................... 348/906 |

FOREIGN PATENT DOCUMENTS

| | | |
|---|---|---|
| 0566454 | 10/1993 | European Pat. Off. . |
| 3921847 | 7/1989 | Germany . |
| 42 40 187 A1 | 11/1992 | Germany . |
| 61-264430 | 11/1986 | Japan . |
| 0060377 | 3/1987 | Japan . |
| 0160188 | 6/1989 | Japan . |
| 0006130 | 1/1991 | Japan . |
| 0022770 | 1/1991 | Japan . |
| 9203018 | 2/1992 | Japan . |
| 404185088 | 7/1992 | Japan . |

OTHER PUBLICATIONS

Brugliero, V., "Digital On–Screen Display a New Technology for the Consumer Interface" *Symposium Record Cable Sessions* pp. 571–582, Jun. 11, 1993.

*Primary Examiner*—Victor R. Kostak
*Attorney, Agent, or Firm*—Christie, Parker & Hale, LLP

[57] ABSTRACT

The present invention provides a scheme for merging television schedule information received from multiple sources (26, 28, 30 and 34). In the preferred embodiment, a microprocessor (36) mixes and sorts the schedule information received from multiple source devices (26, 28, 30 or 34). The schedule information is then displayed in a television schedule guide (50). A user can select a program (60 or 62) by pointing to that program in the displayed schedule information (50). The system (10) then carries out an automatic switching/tuning such that the required source device (26, 28, 30 or 34) is input to the destination device (22), and a tuner is then tuned to the selected program's channel (52).

32 Claims, 4 Drawing Sheets

MERGING MULTI-SOURCE INFORMATION IN A TELEVISION SYSTEM

This is a continuation of application Ser. No. 08/623,429 filed Mar. 28, 1996, which is a continuation of Ser. No. 08/424,861 filed Apr. 17, 1995 now issued as U.S. Pat. No. 5,550,576, the disclosure of which is incorporated by reference.

BACKGROUND OF THE INVENTION

The prior art includes several arrangements for presenting information associated with a television schedule guide. This information is often used to provide an on-screen grid-like display of the available channels along with their related television shows. Usually, a list of available channels are displayed on the y-axis and time slots occupy the x-axis. These listed channels can appear sequentially or in any preferred, predetermined order within the display on the television. U.S. Pat. No. 5,353,121 is representative of such systems, and has found wide success in the industry. U.S. Pat. No. 5,353,121 is hereby incorporated by reference.

Many different transmission schemes are available for providing the information required for a television schedule guide. For example, a Direct Broadcast Satellite System (DBS) can provide television programs and television program schedule information via a satellite dish in conjunction with a set-top receiver. DBS systems are commercially available from, for example, Hughes and Primestar. In addition, conventional satellite dishes, coax cable, telephone lines, fibre optic cable, antennae, etc. are used to distribute television program and/or program schedule information.

If DBS is subscribed to by a user, then a separate IRD (integrated receiving decoder) box with an on-screen display generator is usually provided. An IRD box usually includes a receiver and a tuner at the most basic level. A DBS subscriber receives access to potentially hundreds of television channels along with a program guide provided/controlled by the DBS service provider. Unfortunately, a DBS system normally does not receive local network or local independent channels. In order to provide these missing local channels, some DBS receivers are capable of automatically switching between the DBS satellite input and a local input. This is accomplished by placing the IRD box between the television (or a VCR connected to the television) and the local line (local cable or local antennae). When a local channel is selected by the user, the IRD box automatically removes DBS from service and becomes a bypass for the local input. A user can select a local channel either manually or with a remote control. Access to locally available channels is crucial because the majority of prime time viewing is on those local networks.

In contrast, if a user is receiving television channels from both cable and a local antenna sources, then the scenario is different. If the user's television has multiple television input ports, then these two sources can easily be attached to the two input ports. This solution works well as long as the number of sources does not become greater than the number of television input ports.

If the user's television does not have multiple inputs, then a manual switch box attached to the multiple sources and to the television input can be utilized. This solution forces the user to manually switch between one source and another depending on which channel is desired. For example, if the user wants the local news, which is available from the local antennae, and the switch is set to cable, then the user must manually switch from cable to the local antenna. In a society filled with remote controls and automation, this solution is unacceptable to many consumers. Moreover, manually switching between channels becomes more complicated as the number of channel sources is increased.

While the IRD box, multiple television input ports, manual switching unit, etc. provide non-automated and sometimes partial solutions to the above-described problems, a more versatile technique is needed.

SUMMARY OF THE INVENTION

In the preferred embodiment, the present invention is directed to coordinating input signals and program information, and more particularly to (1) coordinating television schedule guide information received from multiple sources, (2) automatically switching to a desired signal source, and (3) tuning to a desired television program. Thus, the present invention provides a tuning scheme which coordinates television schedule guide information. This information can be received from numerous sources. These sources include an incoming cable line (e.g., on a coax cable), satellite broadcasts, a dedicated telephone line (e.g., twisted pair), and any other medium capable of transmitting a signal.

The present invention provides a method of merging channel guide information in a television system. This method includes the receiving and storing of channel guide information. The channel guide information is received from multiple television signal sources. After receiving this channel guide information, the system mixes and sorts it into a desired order. Finally, a display of this channel guide information is generated and then shown on a television in the desired order.

These and other advantages will become apparent to those skilled in this art upon a reading of the following detailed description of the invention, which should be taken in conjunction with the accompanying drawings.

DESCRIPTION OF SPECIFIC EMBODIMENTS

Figure 1A:
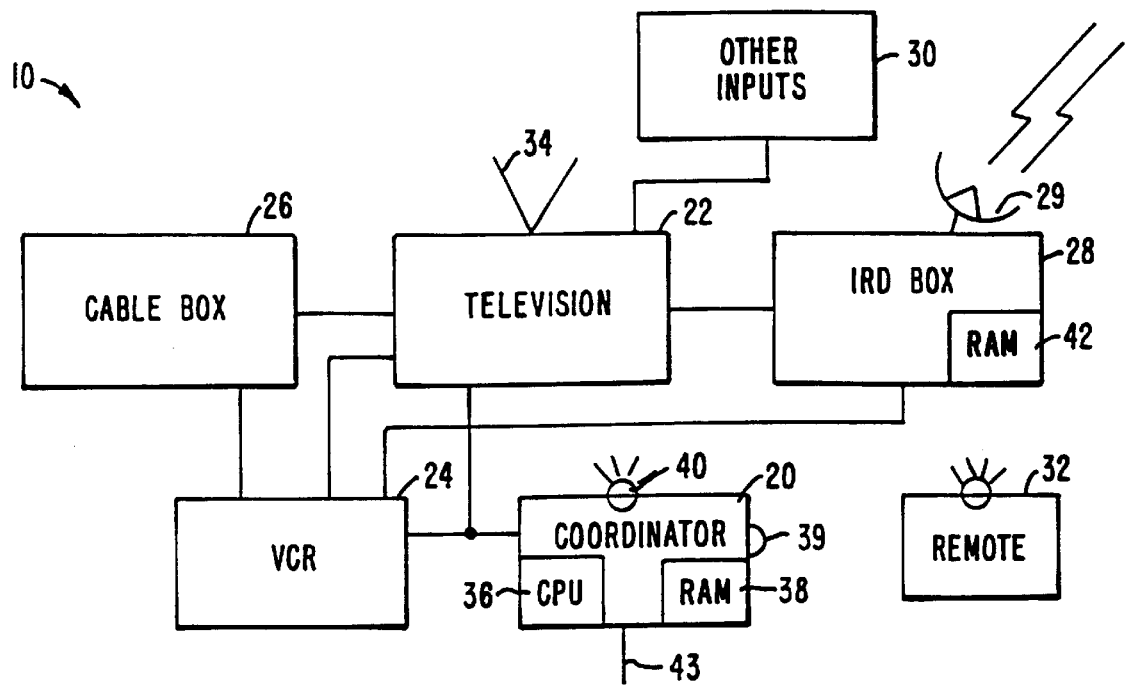
FIG. 1a is a block diagram of a multi-source television program and television schedule guide system with multiple sources connected directly to the television.

The present invention provides a tuning scheme which coordinates television programs and television schedule guide information. This television schedule guide information can be received from numerous sources. As stated above, these sources include an incoming cable line (e.g., on a coax cable), satellite broadcasts, a dedicated telephone line (e.g., twisted pair), and any other medium capable of transmitting a signal. In the preferred embodiment, television channel broadcasts are received from at least two separate sources such as (1) cable and a satellite dish, or (2) two different satellites, or (3) local cable and DBS sources. The schedule information is provided with a source identifier which identifies that schedule information as being from a particular source. The schedule information is sorted and displayed in an organized fashion to the user.

When a user selects a show or channel located on one of the displayed channels within a displayed guide, the system reads the source identifier associated with that show or channel. In the preferred embodiment, the system then carries out an automatic switching/tuning process that switches the input to the television (either RF or video) to a source device. Source devices include DBS, cable box, television tuner, etc. The system then tunes to the required channel for the desired show. Additionally, the source identifier can be utilized to switch between various devices automatically when unattended VCR programming is desired. Furthermore, when program information is received from multiple satellite sources and a desired channel is selected, the present invention can, in one embodiment, automatically move the customer's satellite dish such that the customer receives the desired program from the associated source. The present invention then tunes to the correct channel.

In creating a merged television guide, a channel map is created which identifies the channels available on the multiple sources, and identifies their source. For example, in the case of DBS/local channel implementations, a channel map is created with both local cable and DBS channels merged. The local channels and the DBS channels are tagged with a source identifier. When the user/consumer selects a non-DBS channel from the guide, the integrated receiver decoder unit (IRD box) for the satellite switches the IRD to couple the local cable to the receiver. The system then tunes the television tuner or other tuning device to the required channel. If a DBS channel is later selected, the system switches the IRD to couple the satellite receiver/decoder to the receiver. The system then tunes the DBS tuner to the selected DBS channel. In the case of, for example, cable and antenna inputs, the system switches to the correct video input and then tunes the television tuner to the required channel for receiving the selected source. Thus, automatic access to multi-source television schedule guide information is provided.

In another embodiment of the present invention, the user can utilize the system to switch between destination devices. For example, information/programs received from one of the multiple sources could be displayed on a computer screen or played on a stereo. Additionally, several destination devices can be used in conjunction with each other. For example, an FM radio station playlist could be shown on a computer monitor or television display, and the songs selected from that playlist could be later recorded on an audio recorder. Still further, the system could be used to couple audio TV outputs to a stereo system. Thus, the present invention is not limited to television systems.

FIG. 1a illustrates in simplified form an example of a multi-source television schedule guide system 10 with multiple sources connected directly to a television 22. As shown, multi-source television program and television schedule guide system 10 operates under the control of coordinator 20. Television 22 and VCR 24 are provided with input from cable box 26 and IRD box 28. Other inputs 30 may also be supplied to the television 22 and/or VCR 24. A remote control 32 is used by a viewer to tune the television and conduct other operations. In this embodiment, cable is provided via cable box 26, and DBS is provided via IRD box 28. Antennae 34 on television 22 may be used as an additional source of television broadcasts along with cable box 26, IRD box 28, and other inputs 30. In one typical embodiment, antenna 34 and cable box 26 are "local" sources. Other inputs 30 can include multiple satellite sources. When multiple satellite sources are present, coordinator 20 switches between the available satellite sources by automatically moving the user's satellite dish or switching between satellite dishes. In order to automatically move the satellite dish, a memory within IRD box 28 tracks the position of the DBS satellite dish in relation to satellite sources which are available via the DBS satellite dish. The IRD box 28 then automatically positions the DBS satellite dish such that the desired satellite source is received by the IRD box 28.

Coordinator 20 includes processor (CPU) 36 and memory (RAM) 38. The coordinator is connected to and controls infrared (IR) emitter(s) 40. IR receiver 39 is connected to coordinator 20 and receives input from the remote. IR emitter(s) 40 can be replaced by, for example, a bus interface or an RF transmitter. The IR emitter(s) 40 controls one or more of IRD box 28, television 22, VCR 24, cable box 26, and other inputs 30. Thus, IR emitter 40 acts as a remote control device by emulating remote control signals of television 22, VCR 24, cable box 26, and/or other devices. Because coordinator 20 has the ability to simulate a remote controller, coordinator 20 can be placed in the cable box 26, VCR 24, television 22, stand alone unit 20, or a satellite receiver.

Remote control 32 is a hand-held remote controller for controlling coordinator 20. In the preferred embodiment, remote control 32 is provided with an IR transmitter which controls the coordinator via IR receiver 39. Other remote controls, not shown in FIG. 1a, can be used for manually controlling television 22, VCR 24, cable box 26, IRD box 28, and other inputs 30. Although, in a preferred embodiment, coordinator 20 performs all the necessary control functions of the system. In a preferred embodiment, remote 32 works with coordinator 20 and emitter 40 to control the various devices in FIG. 1a. For example, as the user adjusts the volume control on remote 32, coordinator 20 emits signals through IR emitter 40 to adjust the volume in television 22.

IRD box 28 receives television programs along with other information via, in one embodiment, satellite dish 29. IRD box 28 then provides program schedule information to the system. The schedule information is added to the transmitted signal by the DBS service provider or a company under contract. Examples of DBS service providers include Direct TV and USSB. This program schedule information (or guide) may also include a channel map that contains the channel information which is available on a particular source. Information associated with the DBS guide is saved in the IRD box receiver's RAM 42 or downloaded. Similarly, program guide information can be received through cable box 26, other inputs 30, antennae 34, and/or through any other transmission medium (e.g., dedicated twisted pair telephone line). Each of these sources may also be provided with television schedule data within the signal transmitted by the service provider.

Coordinator 20 finds and sorts the program guide information available in system 10. In order to receive the required television guide information, coordinator 20 is connected to the source(s) of this information. For example, if the channel map information is provided by a dedicated twisted pair telephone line, then that telephone line is input 43 to coordinator 20. Guide information can be provided from any commercially available medium and can apply to all or several of the available sources. In the preferred embodiment, television guide information is provided via the vertical blanking interval on an available television channel. In FIG. 1a, the source devices along with coordinator 20 are coupled to television 22. Thus, coordinator 20 receives the program guide information via telephone line 43, and television 22 receives the television programs from the multiple sources. In addition, television 22 receives the program guide information from coordinator 20.

Figure 1B:
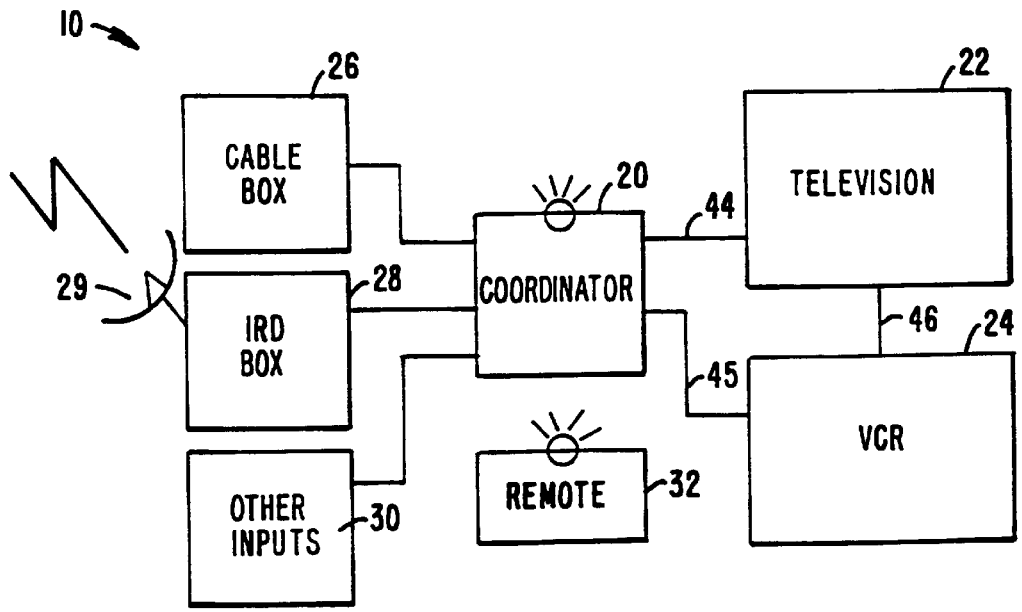
FIG. 1b is a block diagram of a multi-source television program and television schedule guide system with the multiple sources connected directly to the coordinator.

In another embodiment of the present invention, coordinator 20 receives all the source device inputs directly. FIG. 1b is a block diagram of a multi-source television program and television schedule guide system with the multiple sources connected directly to the coordinator. In this embodiment, coordinator 20 switches between the multiple sources 26, 28 and 30 and then outputs the information from the desired source to television 22 or to another destination device. This arrangement allows for a single input to television 22. Coordinator 20 inputs program guide information along with television programs to television 22 via line 44 or through VCR 24 via lines 45 and 46. Other possible destination devices for the present invention are computer monitors, audio recorders, facsimile machines, printers, memory, etc.

Figure 1C:
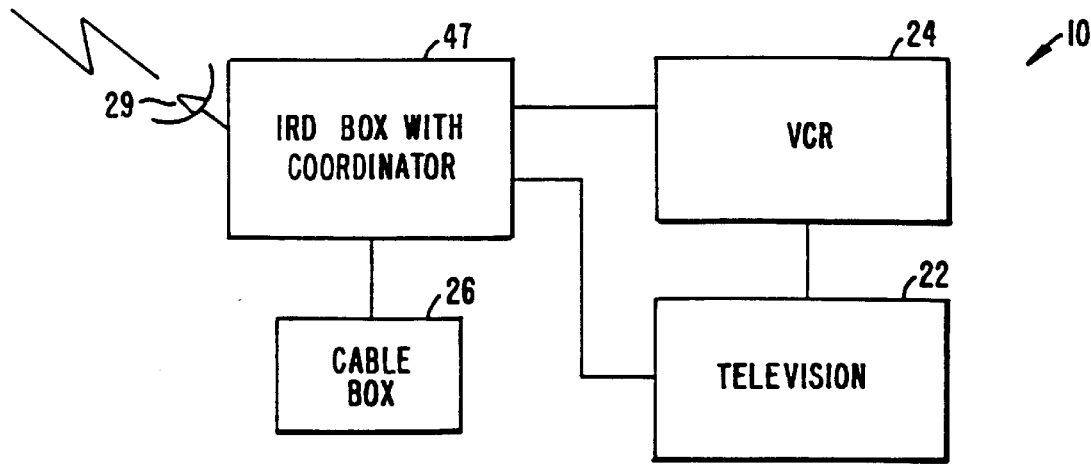
FIG. 1c is a block diagram of a television program and television schedule guide system with DBS and cable as source devices.

In yet another embodiment of the present invention, DBS (via IRD box 28) and cable (via cable box 26) are source devices which are connected in series to television 22. FIG. 1c is a block diagram of a television program and television schedule guide system with DBS and cable as source devices. In this arrangement, the coordinator is located within IRD box 47, and no IR emitter is needed. IRD box 47 inputs to television 22 directly or through VCR 24. When DBS is removed from service by the coordinator within IRD box 47, cable box 26 inputs to television 22.

Figure 1D:
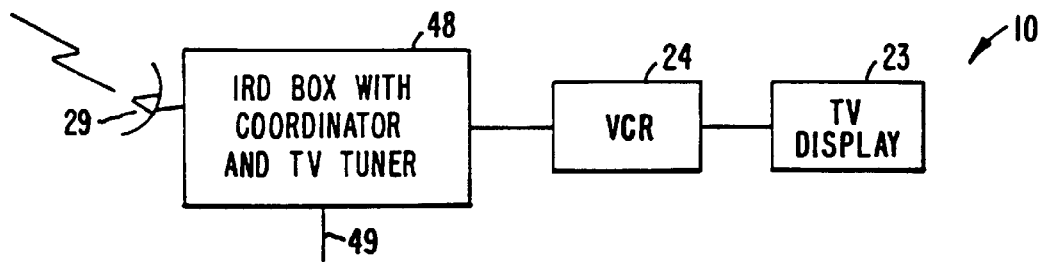
FIG. 1d is a block diagram of a television program and television guide system which has DBS, the coordinator, and the television tuner all within the same IRD box.

FIG. 1d is a block diagram of a television program and television guide system which has DBS, the coordinator, and the television tuner all within the same IRD box. In this additional embodiment, no cable source is present, and DBS, the coordinator and the television tuner are all located within IRD box 48. Thus, no emitter is needed. The coordinator switches between DBS and other available source(s) received on line 49. After the coordinator has switched and tuned to the desired channel, (as described below) that channel is displayed on television display 23 or recorded by VCR 24. The VCR set forth in FIGS. 1a–1d is optional. Additionally, the DBS receiver and tuner could be located within the television or the VCR.

Various formats can be used for the television schedule information. For example, data packets comprising a header section and information section can be received and sorted with other, more complex data packet formats. In the preferred embodiment, coordinator 20 takes the television schedule information from the available source(s) or a data input line and sorts/mixes it. For example, coordinator 20 may receive program schedule information via the vertical blanking interval in a television channel or via a transponder of DBS.

In order to sort/mix the available schedule information, coordinator 20 first creates a structured framework and then saves the received data in that structured framework. This structure framework includes several levels for organized data storage. After the levels of the framework are prepared by coordinator 20, pointers are utilized to save data within appropriate levels of the structure.

In an alternative arrangement, the sorting/mixing of program schedule information is done in a separate location and then provided to system 10, for example, on a satellite channel. Thus, program schedule information, which has already been mixed, sorted, organized, etc., is received in a format which is ready for immediate display. Less memory is required within the coordinator in this latter situation because only the screen/grid being viewed needs to be saved. For example, in this latter situation, if a user wishes to view a grid guide which is four hours long, only four hours worth of information needs to be saved within RAM 38. This ready-for-immediate-display format can also be provided in a separate data stream via a different medium or on a television channel.

Figure 2:
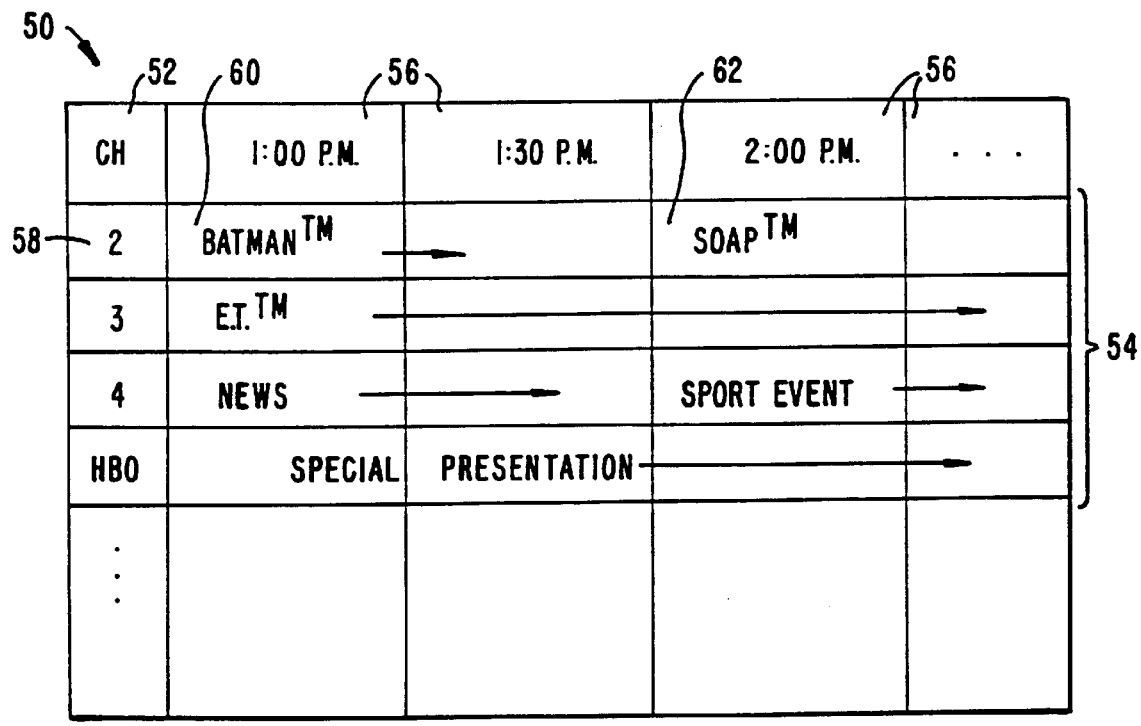
FIG. 2 is an example of an on-screen display of a schedule grid guide that has been assembled from the television guide information.

FIG. 2 is an example of an on-screen display of a schedule grid guide that has been assembled from the television guide information. The grid guide of the present invention also refers to and includes theme guides, channel guides, and other guides which display program information. In the preferred embodiment, after coordinator 20 has collected and sorted all the available program guide information, coordinator 20 generates the grid guide set forth in FIG. 2 for display on television 22. This grid guide can also be generated within the IRD box, a satellite receiver, the television, the VCR, a central office location, etc. The grid guide, designated generally with the reference numeral 50, provides a line up of all channels or a selection of channels 52 along with a description of the shows 54 available on those channels at certain times 56. For example, channel 2 58 has BATMAN 60 as a show from 1:00 p.m. to 2:00 p.m. and SOAP 62 as a show from 2:00 p.m. to 2:30 p.m. A theme, or channel, or random, etc. listing can be used instead of the grid guide shown in FIG. 2.

If a grid guide is used, the lineup of channels 52 can be arranged such that (1) channels are in numerical and/or alphabetical order, or (2) channels are in an order associated with their particular source, or (3) channels are in a mixed order programmed by a user, or (4) channels are in any other arrangement. When multiple sources are used for receiving television channels, an overlap of channels sometimes occurs. For example, both cable and DBS may carry the network ABC, but cable may have ABC on channel 6 and DBS may have ABC on channel 7. By having the ability to delete and activate the channels displayed in grid guide 50, the user can determine whether to have one of the ABC channels, both of the ABC channels, or neither of the ABC channels. The user's choice is entered into coordinator 20 via remote control 32. In an alternative embodiment, coordinator 20 may automatically note duplicate network names and delete one of the duplicates. In addition, coordinator 20 is capable of automatically lining up channels based on user's habits. If this mode for the automatic arrangement of channels is selected by the user, an algorithm based on user habits is used to determine the channel order 52. Therefore, any desired arrangement for the lineup of channels 52 is available.

In the preferred embodiment, the user displays grid guide 50 by pressing a guide button on remote control 32. Coordinator 20 responds to the initial pressing of the guide button by automatically tuning to the channel or device which carries grid guide 50, or overlaying a grid guide in a current broadcast. When the user is done with grid guide 50, the user presses the guide button again (or an exit button) and coordinator 20 (1) automatically returns to the channel or source last viewed by the user or (2) removes the overlay. The technique utilized by coordinator 20 for automatic tuning is described further below.

In order to track which channels are available from which sources, a source identifier is located on each channel. Each of the source identifiers may be included in the channel guide information, or the source identifiers may be added by the system based on the origin of the channel guide information. Therefore, if these data are not already provided, coordinator 20 attaches the appropriate identifiers to the received channel guide information. For example, if BATMAN 60 is received through IRD box 28, than BATMAN 60 will have a source identifier for identifying the IRD box 28 located on its channel 58. In the preferred embodiment, the source identifier is not displayed to the user. If desired, the user can program coordinator 20 to display which source the channel is associated with. For example, channels which come from cable box 26 can be colored red in grid guide 50 and channels available from IRD box 28 can be the color green; thus, if desired, the user can easily identify which source is associated with each channel.

Remote 32 can be utilized by the user to program coordinator 20 or to move between different channels, times and shows in grid guide 50. Moreover, remote control 32 can be used to select a certain channel or show (1) for displaying additional information associated with a particular show, (2) for tuning to a particular channel or show, or (3) for automatically recording a particular show. Remote control 32 can also be used for adjusting the volume or other features of television 22 or other devices. The additional information associated with a particular show may include a short description of that show. For example, a short description of the story included in a sitcom may be provided. To display this additional information, coordinator 20 accesses the desired information in RAM 38 or switches to a different input of data, and displays the additional information in an appropriate place within grid guide 50. In the preferred embodiment, this additional information is displayed (1) in an overlay, or (2) as a pull down window under the selected show, or (3) as a defined information window at the top or the bottom of the screen.

Figure 3:
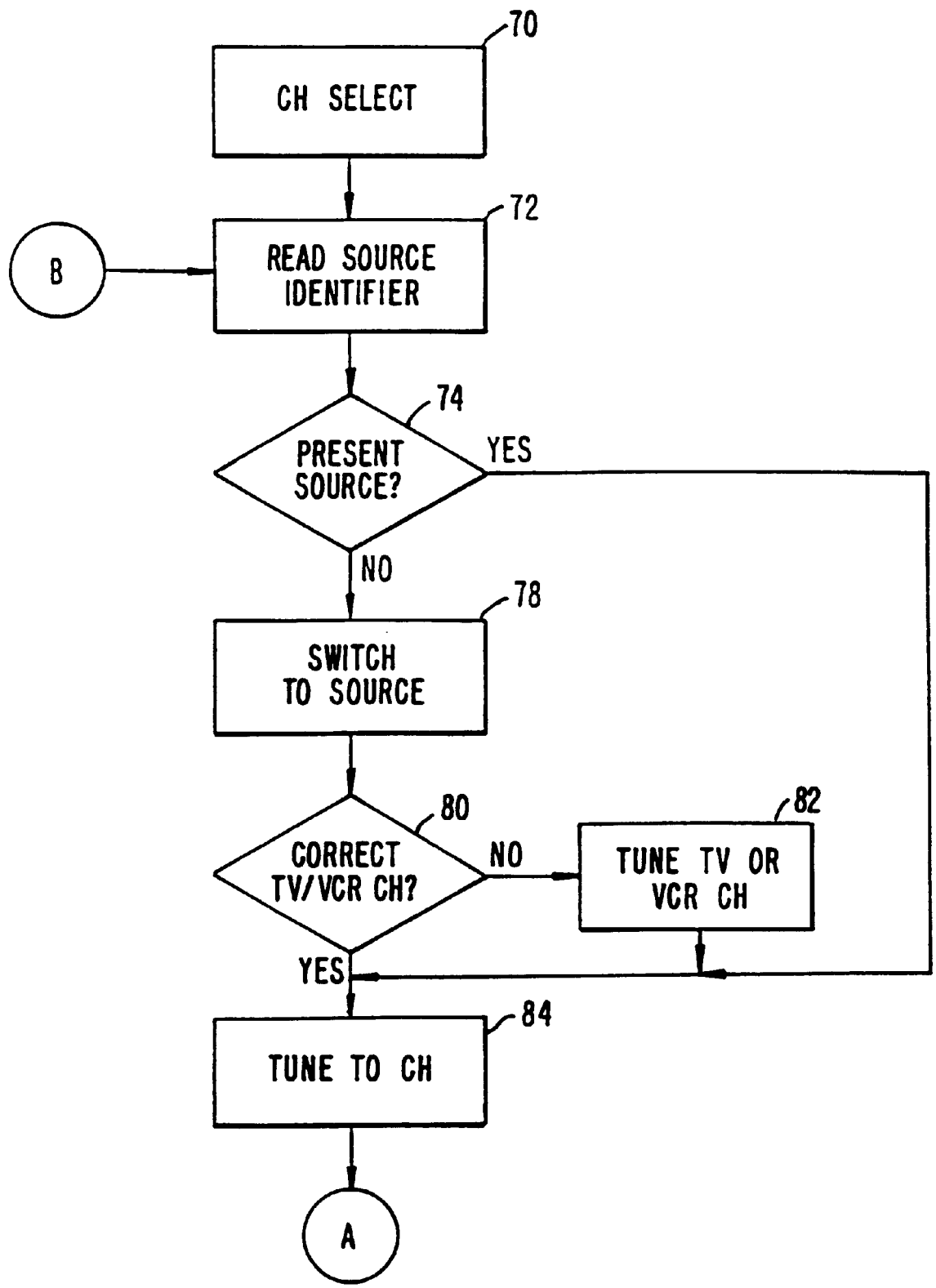
FIG. 3 is an exemplary process flow chart for automatic tuning.

FIG. 3 is an exemplary process flow chart for automatic tuning. To begin automatic tuning, the user selects a certain channel or show at step 70. The selection may be made by, for example, scrolling a cursor to a desired show and striking the "enter" key, or entering a channel number using remote 32. Coordinator 20 then reads the source identifier at step 72 and determines if the present input to television 22 is the source associated with the source identifier (see step 74). If the present input source to television 22 is the same as the source associated with the source identifier, then coordinator 20 tunes that particular source to the desired channel at step 84. If the present source is not the source associated with the source identifier, then the system switches sources to the proper source. For example, processor 36 may cause IR emitter 40 to send out a signal which switches from the present source, and which activates or switches to the source associated with the source identifier. The desired channel or show then serves as the source inputting information to television 22. Coordinator 20 then determines if the correct television channel or input for that particular source (the source associated with the source identifier) is activated at step 80. If the correct television channel or input is not activated, then the appropriate tuner in the system is tuned to the proper channel. For example, IR emitter 40 may be used to tune the television to the desired television channel at step 82. Alternatively, step 80 could be removed, and coordinator 20 would then always tune or re-tune to the required channel, thereby confirming that television 22 is on the correct channel. After (or simultaneous with) the activation of the correct television channel or input associated with the desired source, IR emitter 40 tunes the receiver in that source to the desired channel at step 84. The desired broadcast is then displayed on television 22. If a program is input to television 22 and/or VCR 24 via coordinator 20 (see FIG. 1*b*), then no tuning is needed for the television and/or VCR. Therefore, in this latter arrangement, steps 80 and 82 are not present.

To further illustrate the process set forth in FIG. 3, the following example is provided. In this example, IRD box 28 has channels 100–200 available and is presently the input source to television 22 (see FIG. 1*c*). Additionally, cable box 26 is an input to IRD box 28 (see FIG. 1*c*). A user selects BATMAN 60 on channel 2 58 at step 70. The selected show is available on a channel from cable box 26. Coordinator 20 reads the source identifier associated with the selected show and determines that channel 2 is from cable box 26 at step 72. Coordinator 20 then determines that the present source is IRD box 28 at step 74. Therefore, a switching of sources must occur. As set forth above, when DBS is no longer the selected source, IRD box 28 allows cable box 26 to send signals through an internal relay (electronic or mechanical) within IRD box 28 to television 22. Therefore, coordinator 20 utilizes IR emitter 40 to deactivate or decouple DBS at step 78. IRD box 28 is inputted to television 22 through channel 3 of television 22. In the present arrangement, cable box 26 is also connected through channel 3 of television 22. Coordinator 20 may then check television 22 to ensure that it is on channel 3, as required for input from cable box 26 (see step 80). Since television 22 is already on channel 3, no change is made to the television channel (see step 84). Coordinator 20 then utilizes IR emitter 40 to tune cable box 26 to the desired channel 2 at step 84. As stated above, step 82 and step 84 can occur simultaneously. The program on is then displayed on television 22, and the process set forth in FIG. 3 is complete. In other embodiments, the television tuner will be used to select from numerous inputs from the sources, or a mixed system may provide that the television tuner is used for some sources, and the source tuner is used for other sources.

Figure 4:
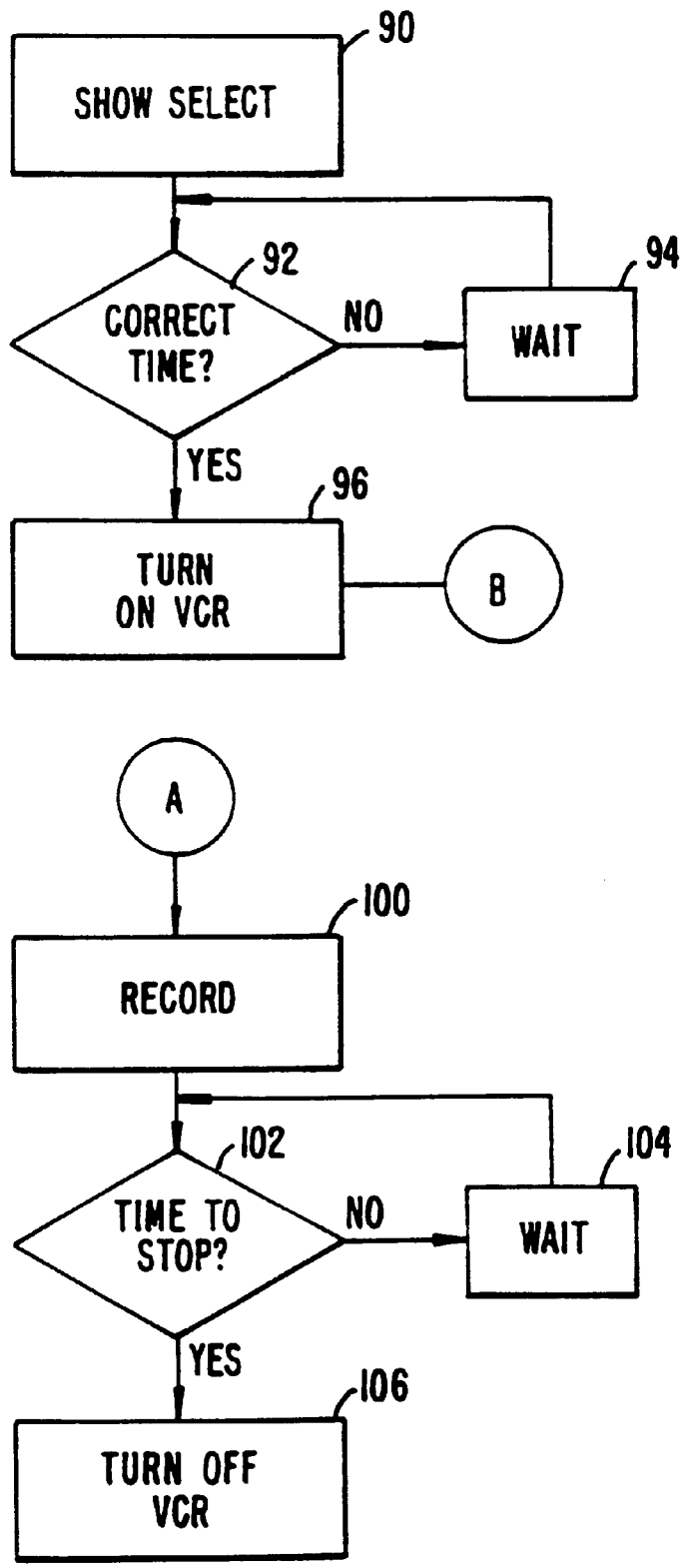
FIG. 4 is an exemplary process flow chart for automatic, unattended recording.

FIG. 4 is an exemplary process flow chart for automatic, unattended recording. To begin automatic, unattended recording, the user selects a television show for recording with remote 32. In order to provide the automatic recording of the selected program, VCR 24 is automatically turned "on" (along with the activation of the VCR's record feature) at the appropriate time and then turned "off" when the show is complete. The tuning process used for automatic recording is the same as the process set forth for automatic tuning (see FIG. 3), but the VCR is tuned to the correct channel rather than the television.

As set forth in FIG. 4, after the user selects a show at step 90, the coordinator checks to see if the beginning time for that show has passed (see step 92). If the beginning time has not passed, coordinator 20 waits at step 94. When the correct time (the program's starting time) does occur, VCR 24 is turned "on" (see step 96) and coordinator 20 acts as though automatic tuning has occurred. Therefore coordinator 20 reads the source identifier associated with the channel providing the selected show at step 72 (see FIG. 3). This transition between the process flow for automatic recording and the process flow for automatic tuning is indicated by B. During the tuning sequence for automatic recording, the VCR, rather than the television, is tuned to the correct channel (see steps 80 and 82). When the process flow set forth in FIG. 3 is complete, as indicated by A, coordinator 20 utilizes IR emitter 40 to activate the recording feature of the VCR at step 100 in FIG. 4. This causes VCR 24 to record the selected program. Coordinator 20 then checks to see if the end time of the show matches the present time at step 102. If the show is not over, coordinator 20 waits at step 104. When the end time for the show matches the present time, IR emitter 40 stops recording the show and then turns "off" the VCR at step 106. This scheme allows for the unattended, automatic recording of any show available from any source coupled to VCR 24.

In another embodiment of the present invention, coordinator 20 is located within IRD box 28, and coordinator 20 handles the switching and tuning required for DBS and cable sources without utilizing an IR emitter. When the user/consumer selects a non-DBS channel from the guide, the coordinator switches from the integrated receiver decoder unit for the satellite to the cable (if the source is originally DBS), and proceeds to tune the television tuner, or television tuner and cable box to the required channel. If a DBS channel is later selected, the system switches back to the integrated receiver decoder unit and tunes to the required DBS channel. This arrangement allows for the coordinating of multi-sources without the need for an IR emitter.

With the assistance of coordinator 20, a user does not have to manually select a television program source or manually tune to a desired channel or program. Moreover, with the automatic receiving, grid guide generating, switching, and tuning available in system 10, there is little if any manual interaction from the end user or customer.

While a full and complete disclosure of the invention has been provided herein above, it will be obvious to those skilled in the art that various modifications and changes may be made.

What is claimed is:

1. A method for providing a consolidated channel guide information listing to a television system, the method comprising the steps of:

receiving individual channel guide information listings from at least two information sources by a merging system;

merging at least a portion of each of said individual channel guide information listings to form the consolidated channel guide information listing;

providing the consolidated listing to the television system, wherein the consolidated listing provided to the television system contains program listings for at least two signal providing sources, and a signal source identifier for each program listing, each identifier identifying one of said signal providing sources; and thereafter generating a display of at least a portion of the consolidated channel guide information listing.

2. The method of claim 1, wherein said display includes a representation of said signal source identifiers for each program listing in said display.

3. The method of claim 2, wherein said representation includes displaying program listings associated with a first one of said signal source identifiers in a first color, and program listings associated with a second one of said signal source identifiers in a second color, said first and second identifiers identifying a different signal providing source.

4. The method of claim 1, wherein said providing step includes the step of transmitting the consolidated listing over at least one television signal source.

5. The method of claim 4, wherein said transmitting step includes the step of relaying the consolidated listing through a satellite.

6. The method of claim 4, wherein said television signal source is selected from the group consisting of a cable, a broadcast source, a direct broadcast satellite system.

7. The method of claim 4, wherein said at least one television signal source is one of said signal providing sources.

8. The method of claim 1, wherein said generating step includes the step of displaying said display on one of a television display screen, a computer monitor and a printed medium.

9. The method of claim 1, wherein said information sources are selected from the group consisting of a cable, a broadcast source, a direct broadcast satellite system, a telephone line, and a keyboard.

10. An information merging system, comprising:

a receiver for receiving individual channel guide information listings from at least two information sources;

a microprocessor coupled to said receiver, said microprocessor merging at least a portion of each of said individual channel guide information listings into a consolidated channel guide information listing;

a signal provider, wherein said signal provider provides said consolidated listing to a television system, wherein said consolidated listing provided to said television system contains program listings for at least two signal providing sources, and a signal source identifier for each program listing, each identifier identifying one of said signal providing sources; and a display generator, coupled to said television system, for generating a display of at least a portion of said consolidated channel guide information listing.

11. The information merging system of claim 10, wherein said display includes a representation of said signal source identifiers for each program listing in said display.

12. The information merging system of claim 11, wherein said representation includes displaying program listings associated with a first one of said signal source identifiers in a first color, and program listings associated with a second one of said signal source identifiers in a second color, said first and second identifiers identifying a different signal providing source.

13. The information merging system of claim 10, wherein said signal provider includes a transmitter coupled to said microprocessor for transmitting said consolidated listing over at least one television signal source.

14. The information merging system of claim 13, wherein said signal provider further includes a satellite, wherein said transmitted consolidated listing is relayed through said satellite.

15. The information merging system of claim 13, wherein said television signal source is selected from the group consisting of a cable, a broadcast source, a direct broadcast satellite system.

16. The information merging system of claim 13, wherein said at least one television signal source is one of said signal providing sources.

17. The information merging system of claim 10, wherein said display generator is selected from the group consisting of a television display screen, a computer monitor and a printing device.

18. The information merging system of claim 10, wherein said information sources are selected from the group consisting of a cable, a broadcast source, a direct broadcast satellite system, a telephone line, and a keyboard.

19. A method for operating a television system having multiple signal providing sources, the method comprising the steps of:

receiving individual channel guide information listings from at least two information sources by a merging system;

merging at least a portion of each of said individual channel guide information listings to form the consolidated channel guide information listing;

providing the consolidated listing to the television system, wherein said consolidated listing provided to the television system contains program listings for at least two of the signal providing sources, and a signal source identifier for each program listing, each identifier identifying one of the signal providing sources;

identifying a specific program from said consolidated listing;

using said signal source identifier associated with said identified specific program to select a signal providing source from among the signal providing sources; and switching an input of said television system to said selected signal providing source.

20. The method as recited in claim 19, wherein the step of identifying a specific program comprises the steps of:

displaying said channel guide information in the form of a grid; and pointing to said specific program with an indicator.

21. The method as recited in claim 19, wherein said multiple signal providing sources are selected from the group consisting of a cable television source, a satellite source, a DBS source, and an antenna source.

22. The method as recited in claim 19, further comprising the step of tuning a tuner within said television system to said specific program.

23. The method as recited in claim 19, further comprising the step of tuning a television to receive said specific program from said selected signal providing source.

24. The method as recited in claim 19, further comprising the step of tuning a receiver of said selected signal providing source to said specific program.

25. The method as recited in claim 19, wherein said multiple signal providing sources are selected from the group consisting of a plurality of cable television sources, a plurality of satellite sources, a plurality of DBS sources, and a plurality of antenna sources.

26. The method as recited in claim 19, wherein said information source is selected from the group consisting of a coax cable, a direct broadcast satellite system, a telephone line, a fiber optic cable, a keyboard, and an antenna.

27. The method as recited in claim 19, wherein said consolidated listing includes program titles for said program listings.

28. A switching system having multiple signal providing sources, the system comprising:

a receiver for receiving a consolidated channel guide information listing from an information source, wherein said consolidated listing contains program listings for at least two of the signal providing sources, and a signal source identifier for each program listing, each identifier identifying one of the signal providing sources;

a memory, coupled to said receiver, for storing said consolidated listing;

a display, coupled to said memory, for presenting at least a portion of said consolidated listing;

a indicator for indicating a specific program from said presented portion of said consolidated listing;

a controller, coupled to said memory, for receiving an indicator signal associated with said indicated specific program from said indicator, wherein said controller controls said switching system; and an emitter, coupled to said controller, for transmitting a control signal, said control signal switching an input on a television system to one of said multiple signal providing sources, said one of said multiple signal providing sources being identified by said signal source identifier associated with said specific program, and wherein said control signal tunes said television system to receive said specific program;

wherein said specific program is displayed on said television system.

29. The switching system of claim 28, wherein said emitter transmits a second control signal to a VCR, and said second control signal causes said VCR to record said specific program.

30. The switching system of claim 28, wherein said multiple signal providing sources are selected from the group consisting of a cable television source, a satellite source, a DBS source, and an antenna source.

31. The switching system of claim 28, wherein said information source is selected from the group consisting of a coax cable, a direct broadcast satellite system, a telephone line, a fiber optic cable, a keyboard, and an antenna.

32. The switching system of claim 28, wherein said indicator is a remote control unit.

* * * * *

UNITED STATES PATENT AND TRADEMARK OFFICE
CERTIFICATE OF CORRECTION

PATENT NO. : 5,923,362  
DATED : July 13, 1999  
INVENTOR(S) : Brian Lee Klosterman Page 1 of 1

It is certified that error appears in the above-identified patent and that said Letters Patent is hereby corrected as shown below:

Column 1,
Line 54, before "local" delete "a".

Column 5,
Line 67, replace "structure" with -- structured --.

Column 7,
Line 12, replace "than BATMAN 60" with -- then BATMAN 60 --.

Column 12,
Line 17, replace "a indicator" with -- an indicator --.

Signed and Sealed this

Twenty-fifth Day of June, 2002

*Attest:*

*Attesting Officer*

JAMES E. ROGAN
*Director of the United States Patent and Trademark Office*